March 21, 1961   J. W. HARRISON   2,975,931
CONTAINER
Filed June 4, 1959
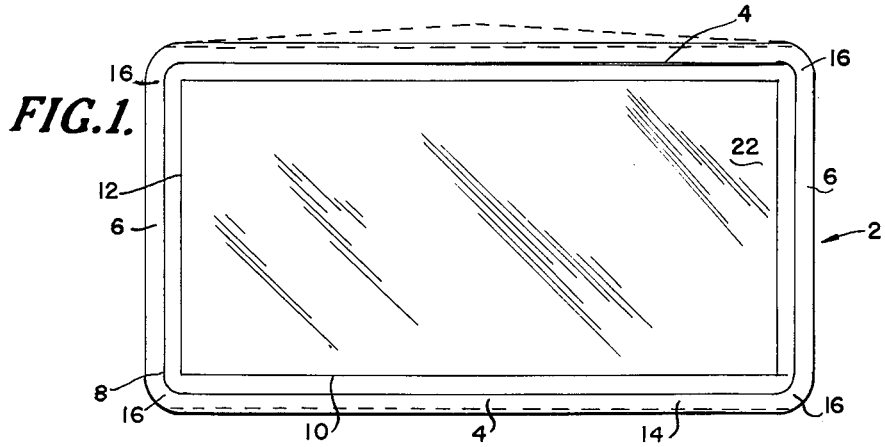
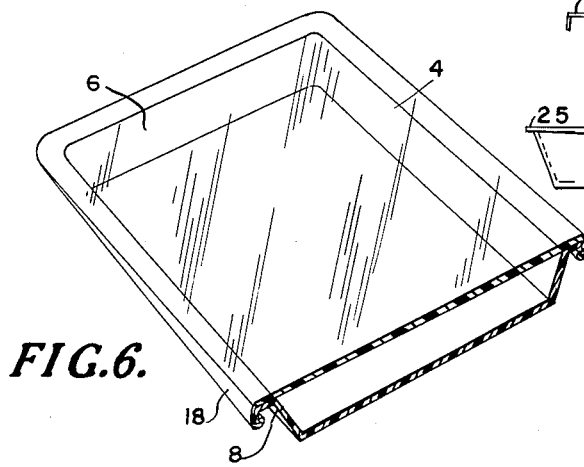
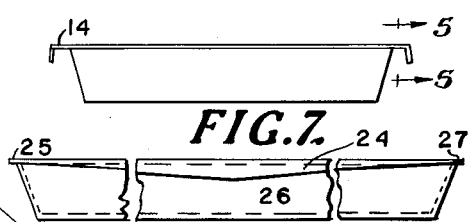
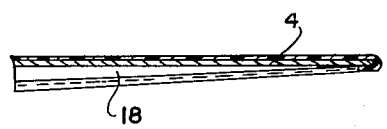
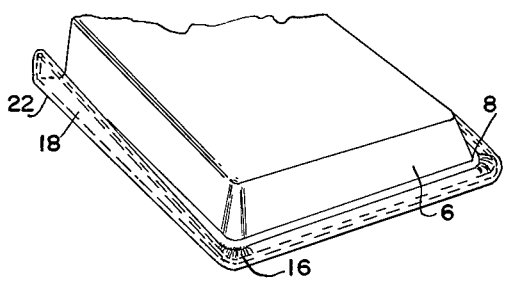
INVENTOR
JOHN W. HARRISON
BY *Cushman, Darby & Cushman*
ATTORNEYS

2,975,931
CONTAINER

John W. Harrison, Winchester, Mass., assignor to W. R. Grace & Co., Cambridge, Mass., a corporation of Connecticut Filed June 4, 1959, Ser. No. 818,216

6 Claims. (Cl. 220—24)

This invention relates to rectangular containers.

In applying a cover of a heat shrinkable plastic film to a semi-rigid container long straight sides cause trouble because of the difficulty of maintaining adequate tension on the cover film near the center of the long side even with an outwardly flared lip. This is due to the shrinking force of the cover film causing the sides to flex or bend inward and the elasticity of the cover film. Thus, a 5 x 9 inch rectangular pan gives trouble on the long sides. However, a 5 x 9 inch oval pan holds the heat shrinkable cover well, as does a 5 inch round or square pan with a ¼ inch outwardly flared lip.

It is an object of the present invention to provide a rectangular container having a pair of relatively long sides which can be used with a heat shrinkable plastic film cover.

Another object is to prepare such a container which can be readily stacked prior to use.

An additional object is to provide a novel combination of a heat shrinkable plastic film cover and a rectangular container.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

The invention will be best understood with reference to the accompanying drawing illustrating a preferred embodiment of the invention wherein:

Figure 1 is a top plan view of the container and cover;

Figure 2 is a side elevation of the container;

Figure 3 is a perspective view of the container and cover;

Figure 4 is an end view of the container;

Figure 5 is a fragmentary sectional view on the line 5—5 of Figure 4;

Figure 6 is a fragmentary bottom elevation of the container and cover; and

Figure 7 is a side elevation at reduced size of another container having an alternate form of the invention.

As the heat shrinkable plastic film, there can be employed biaxially oriented, irradiated polyethylene (e.g. as prepared in Rainer Patent 2,877,500), being irradiated to an extent of 2 to 100 megarad, preferably 8 to 20 megarad, biaxially oriented vinylidene chloride polymer (Saran), biaxially oriented vinyl chloride polymer, biaxially oriented polyethylene terephthalate (mylar), and biaxially oriented polypropylene.

The elastic properties of the heat-shrinkable plastic film used for the cover makes it difficult to maintain intimate contact or an effective seal between the film and the top periphery of the container in the area of the mid-point of the relatively long side of the container. This problem becomes more acute as a minimum area of the film cover material is utilized to cover a container of the general type described herein. Heat is applied to the periphery of the film cover and results in a thickened edge which is elastic, and the resulting shrink tension of this thickened edge holds the film in intimate contact with the peripheral flange of the container. A minimum area of the film cover will be desirable for economic reasons and the final package appearance is also improved when the thickened edge of the film cover remains in close proximity beneath the top flange.

Because of the elastic properties, the force holding the film against the periphery of the container at the mid-point of the sides will be reduced as the relative length of this side is increased, or conversely, the force necessary to overcome the resistance of the thickened elastic band around the periphery of the film cover is decreased. As a result, during handling of such containers, the film covers are loosened and pulled over the extremities of the flange in the area of the mid-point of the relatively long sides.

In the instant invention, surprising results were obtained by using a downward flange around the relatively long side of the container which was tapered from the corners to a maximum width at the mid-point of the side. This improvement in design of the container resulted in more intimate contact of the film cover with the mid-point of the relatively long side of such container.

The rectangular container can be of any semi-rigid material, e.g. metal such as aluminum or tinplate, rigid polystyrene, cardboard, or pulpboard.

Referring more specifically to the drawings, there is provided a 5 x 9 inch rectangular aluminum pan 2 having a pair of top long sides 4 and a pair of top short sides 6. For convenience in stacking, the walls of both the long and short sides converge downwardly from the upper edge 8 to form a pair of bottom long sides 10 and a pair of bottom short sides 12.

There is provided a ¼ inch horizontal flange 14 around the top sides of the container. This flange is preferably crimped to provide rounded corners 16. The outside edge of each of the long sides of the flange is bent downward to provide a skirt 18. The skirt 18 is tapered from about $\frac{3}{16}$ inch depth at the center 20 to just the crimped-under thickness of the metal at the ends 16. This taper is best seen in Figures 5 and 6. To permit nesting, the skirt 18 is flared outwardly slightly.

To use the container 2, an appropriate article, e.g. a prepared dinner containing roast beef, potatoes and peas, is placed therein, and the heat shrinkable cover 22, e.g. of Alathon 14 (polyethylene of molecular weight 20,000 and density of 0.916) which has been irradiated to an extent of 12 megarad and which had been stretched 350% longitudinally and 350% laterally is applied. Heat, from any convenient source (not shown), is applied to shrink the cover 22 under the flange 14 and skirt 18 and to smooth out any wrinkles in the top surface of the cover 1.

It has been found that the container, e.g. the pan 2, with downward-folded convex edge, gives the required film tension to satisfactorily lock the film in the mid-section of the long side 4, where difficulty is normally encountered, as well as through the rest of the long side. The downward-folded edge also stiffens the flared edge to prevent buckling upwardly or downwardly which would otherwise in turn permit easy buckling inwardly.

The top surface of the flared lip should be essentially in a single plane to permit easy masking of the cover film during heat-shrinking of the retaining edge of the film. By appropriate design of the blank from which the pan is made, a rolled bead edge can be employed on the downward bent skirt 18 having a downward taper toward the midpoint thereof.

Obviously, for a large container where all of the sides are longer than approximately 5 inches in length, a tapered skirt may be beneficial on all four sides of the rectangular container.

It is intended that the scope of this invention shall include a taper of the skirt which may be curved as shown in Figure 7. The contour of the skirt 24 from the corner 25 through the midpoint 26 and thence to the corner 27 may be the arc of the circle. The important feature of this unique design is the differential width of the skirt with a minimum width at either extremity in the vicinity of the corner and increasing to a maximum width between the corners. Obviously, the taper of the skirt may run to a minimum in the general area of the corner and need not end precisely at the corner of the flange and the maximum width of the skirt need not be precisely at the midpoint along the length of the side.

The downward skirt 18 along the outside edge of the flange 14 is preferable. However, some advantage will be obtained with the same configuration of the skirt on the flange but without the skirt being bent downward.

The use of this invention will be advantageous for containers made from relatively thin and therefore relatively flexible material in which case the length of the sides may be relatively short as compared to the length of sides on a container made from stiffer and more rigid materials.

What is claimed is:

1. In combination, a rectangular container of rigid material comprising a pair of long sidewalls and a pair of short sidewalls, the upper edges of both pairs of sidewalls terminating in an outwardly extending peripheral flange around the container and a skirt on that portion of the flange connected to each of said long sidewalls, said skirt tapering downwardly from each corner area of the corresponding long sidewall, and a cover of a heat shrinkable plastic film over said container, said cover being heat shrunk into locking engagement with said container under said flange and said skirt to an apex in the vicinity of the midpoint of the long sidewall.

2. In combination, a rectangular container of rigid material comprising a pair of long sidewalls and a pair of short sidewalls, all of said sidewalls converging toward the bottom to facilitate nesting, the upper edges of all of said sidewalls terminating in a substantially horizontal peripheral flange around said container and a downwardly and outwardly tapered skirt on that portion of said flange connected to each of said long sidewalls, the downward taper of the skirt beginning at each corner of the corresponding long side wall and terminating in an apex at the midpoint of the long sidewall, and a wrinkle-free cover of a heat shrinkable plastic film over said container, said cover being heat shrunk into locking engagement with said container under said flange and said skirt.

3. A container and cover according to claim 2 wherein the cover is made of biaxially oriented irradiated polyethylene.

4. In combination, a rectangular container of semi-rigid material, the upper edges of the side walls terminating in an outwardly extending peripheral flange around the container and a skirt connected to the outer edge of the flange on at least two parallel sides of said container, said skirt having a minimum width at each corner and the width increasing to a maximum between said corners, and a cover of heat shrinkable plastic film over said container, said cover being heat shrunk into locking engagement with said container under said flange and said skirt.

5. In combination, a rectangular container of semi-rigid material, all of the side walls converging toward the bottom to facilitate nesting, the upper edges of all of said side walls terminating in a substantially horizontal peripheral flange around said container and a downwardly and outwardly tapered skirt attached to the outer edge portion of the flanges on at least two of the parallel sides of said container, said skirt having a minimum width at each corner and width increasing to a maximum between said corners, and a wrinkle-free cover of a heat shrinkable plastic film over said container, said cover being heat shrunk into locking engagement with said container under said flange and said skirt.

6. A container and cover according to claim 5 wherein the cover is made of biaxially oriented irradiated polyethylene.

References Cited in the file of this patent

UNITED STATES PATENTS

| | | |
|---|---|---|
| 2,119,901 | Bietler | June 7, 1938 |
| 2,711,346 | Irwin | June 21, 1955 |
| 2,877,500 | Rainer | Mar. 17, 1959 |
| 2,878,128 | Jorgenson | Mar. 17, 1959 |

UNITED STATES PATENT OFFICE
CERTIFICATION OF CORRECTION

Patent No. 2,975,931  March 21, 1961

John W. Harrison

It is hereby certified that error appears in the above numbered patent requiring correction and that the said Letters Patent should read as corrected below.

Column 3, lines 41 and 42, strike out "to an apex in the vicinity of the midpoint of the long sidewall" and insert the same after "sidewall" in line 38, same column 3.

Signed and sealed this 29th day of August 1961.

(SEAL)
Attest:

ERNEST W. SWIDER
Attesting Officer

DAVID L. LADD
Commissioner of Patents